J. B. FOOTE.
SPEED REDUCING MECHANISM.
APPLICATION FILED AUG. 28, 1909.

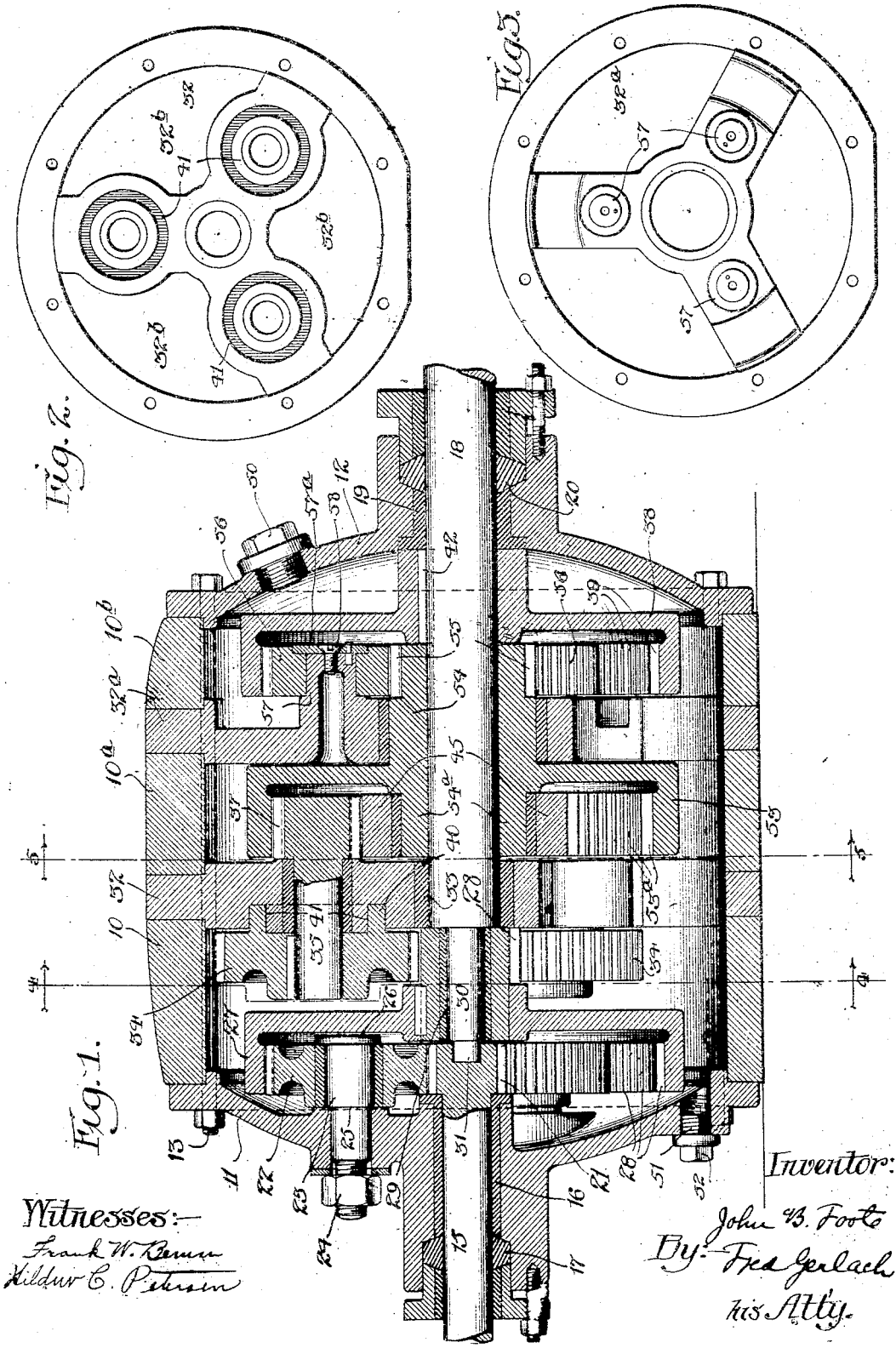

1,059,450.

Patented Apr. 22, 1913.
4 SHEETS—SHEET 2.

Witnesses:

Inventor:
John B. Foote
By his Atty. F. K. Gerlach

J. B. FOOTE.
SPEED REDUCING MECHANISM.
APPLICATION FILED AUG. 28, 1909.

1,059,450.

Patented Apr. 22, 1913.
4 SHEETS—SHEET 3.

Witnesses:—

Inventor:—
John B. Foote
By: Fred Gerlach
his Atty.

J. B. FOOTE.
SPEED REDUCING MECHANISM.
APPLICATION FILED AUG. 28, 1909.

1,059,450.

Patented Apr. 22, 1913.

4 SHEETS—SHEET 4.

Witnesses:

Inventor:—
John B. Foote
By: Fred Gerlach
his Atty.

UNITED STATES PATENT OFFICE.

JOHN B. FOOTE, OF OAK PARK, ILLINOIS, ASSIGNOR TO FOOTE BROS. GEAR & MACHINE CO., OF CHICAGO, ILLINOIS, A CORPORATION OF ILLINOIS.

SPEED-REDUCING MECHANISM.

1,059,450.

Specification of Letters Patent.  Patented Apr. 22, 1913.

Application filed August 28, 1909. Serial No. 514,993.

*To all whom it may concern:*

Be it known that I, JOHN B. FOOTE, a resident of Oak Park, in the county of Cook and State of Illinois, have invented certain new and useful Improvements in Speed-Reducing Mechanism, of which the following is a full, clear, and exact description.

The invention relates to speed-reducing mechanism and designs to provide a mechanism which is simple in construction and in which undue wear of the parts will be effectively avoided. Further, the invention designs to provide an improved speed-reducing mechanism in which the ratio of reduction may be readily varied to vary the speed of the driven shaft with respect to the drive shaft.

The invention still further designs to provide an improved speed-reducing mechanism which comprises plural series of reducing gears and in which there is provided an intermediate support for effectively sustaining the gears in correct relation to avoid undue wear. Another object of the invention is to provide speed-reducing mechanism which is constituted of elements or units whereby the number of reducing gears may be varied by building up the mechanism of units or elements which are capable of being removed or disconnected, so that by the addition or removal or substitution of elements, the mechanism may be employed for reducing speed at different ratios.

The invention consists in the several novel features hereinafter set forth and more particularly defined by claims at the conclusion hereof.

Figure 4:
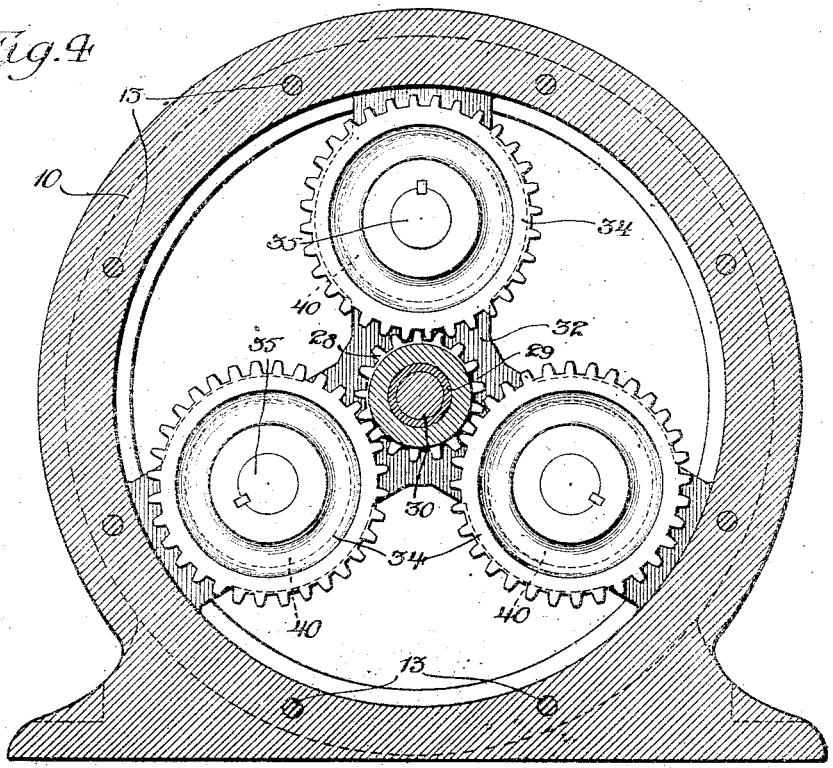
Figure 5:
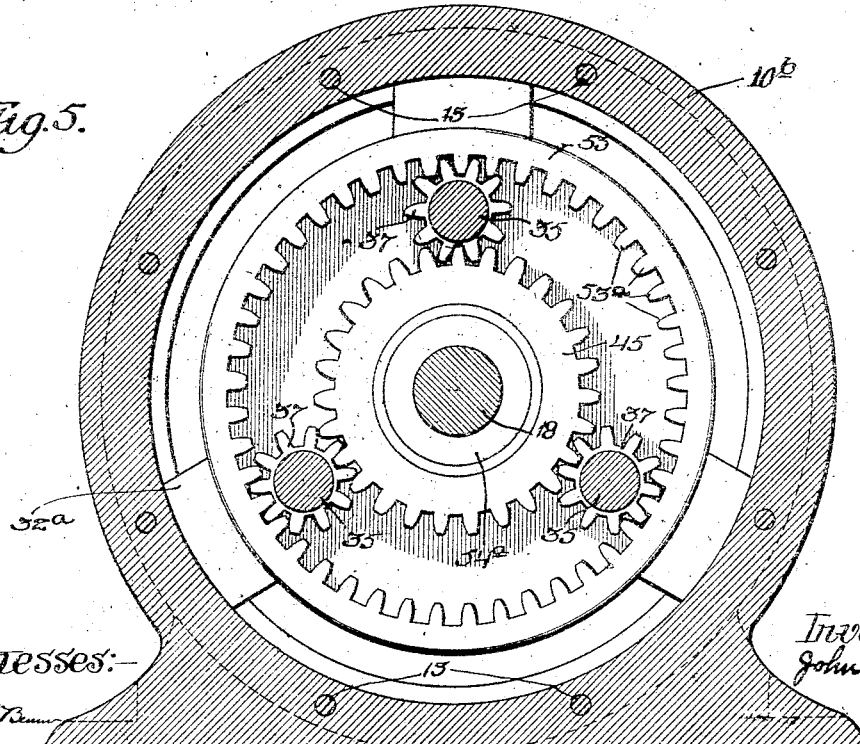
Figure 6:
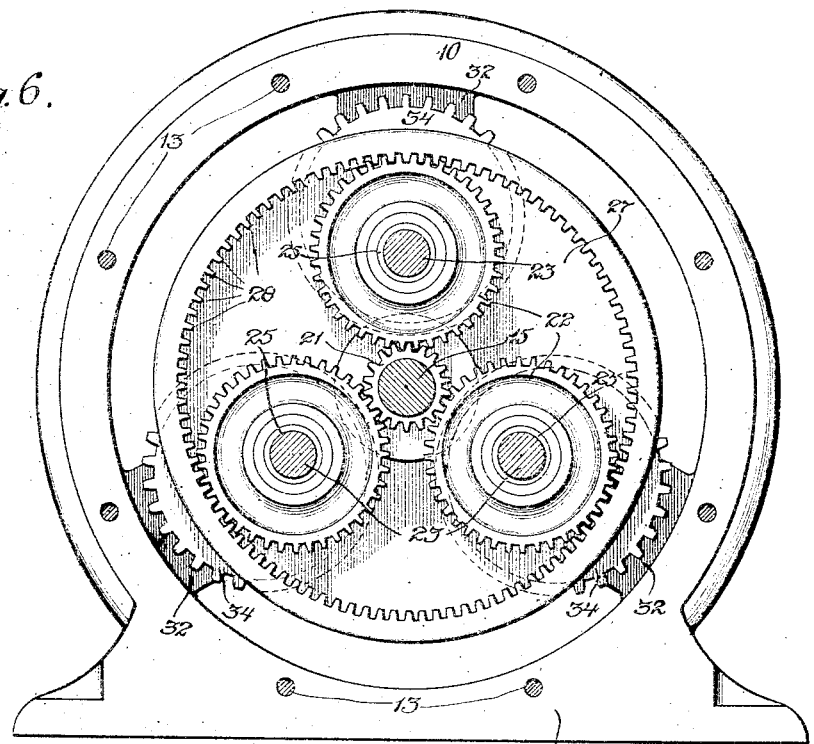
Figure 7:
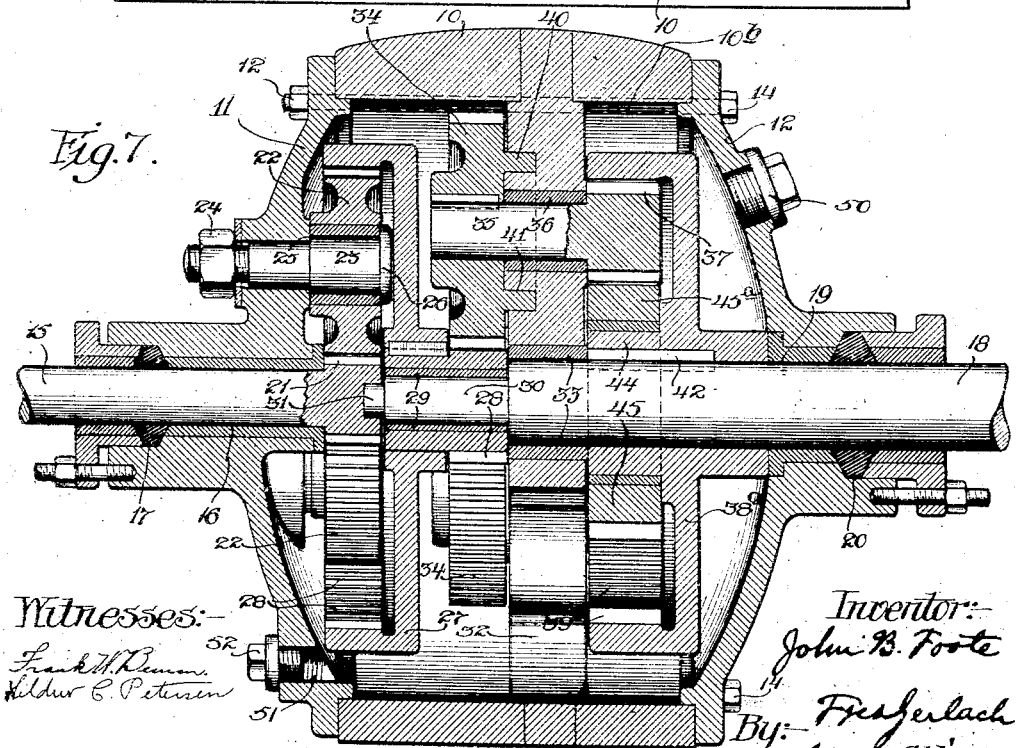
Figure 8:
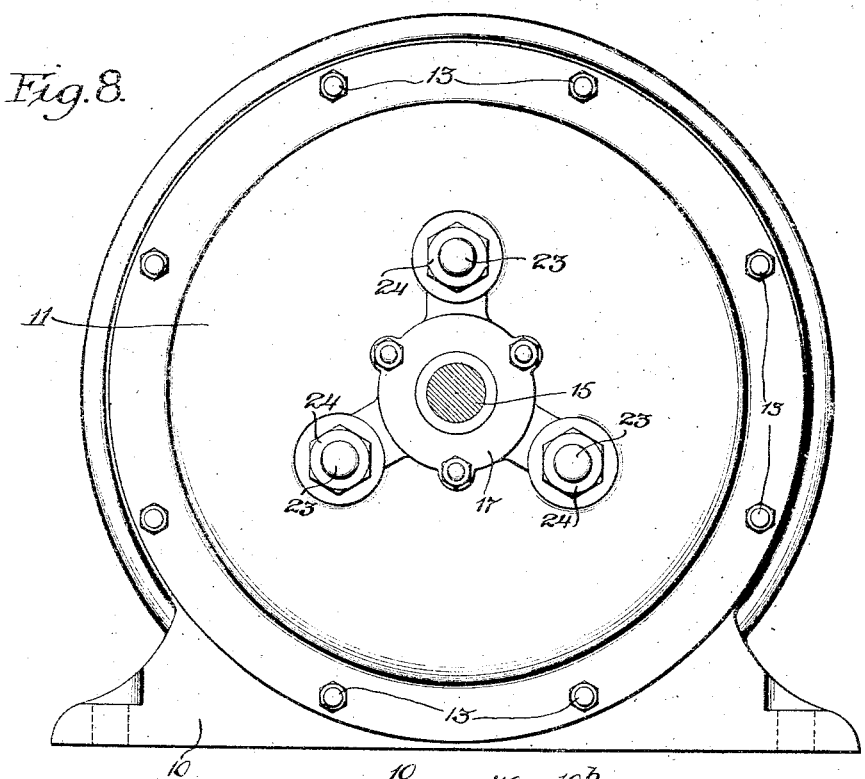
Figure 9:
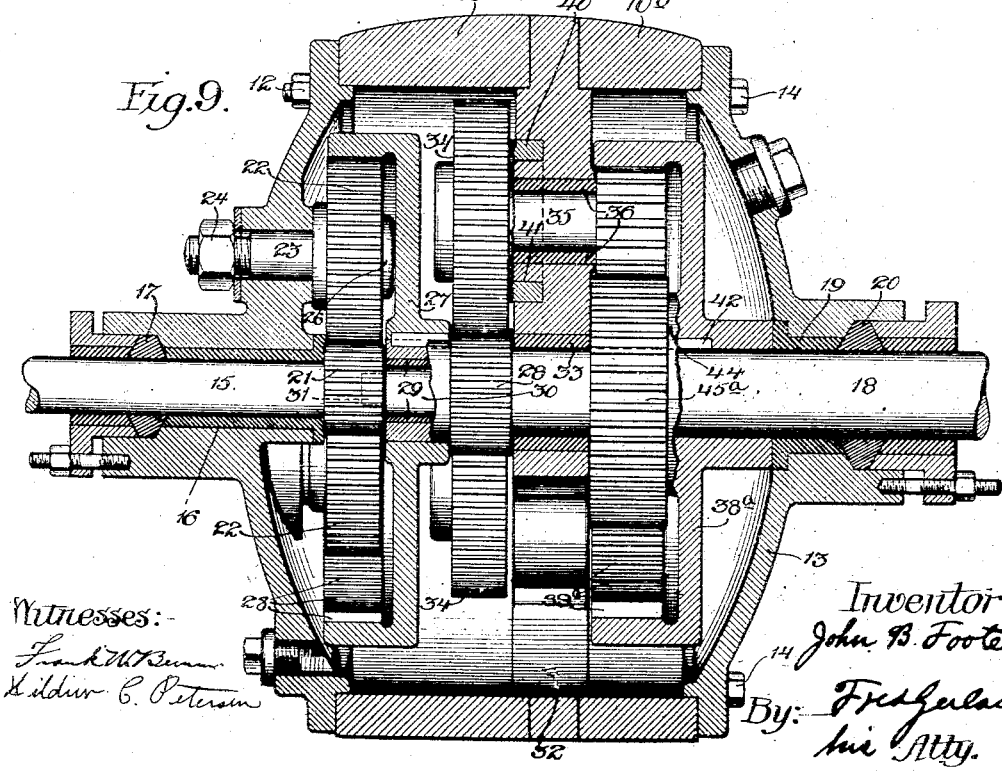

In the drawings: Figure 1 is a longitudinal section of a speed-reducing mechanism embodying the invention. Fig. 2 is a detail of one of the intermediate supports. Fig. 3 is a similar view of another of the intermediate supports. Fig. 4 is a section taken on line 4—4 of Fig. 1. Fig. 5 is a section taken on line 5—5 of Fig. 1. Fig. 6 is an elevation of that side of the mechanism at which the drive-shaft is disposed, the side of the case being removed, and parts being shown in section. Fig. 7 is a central section illustrating the mechanism when organized for a lower number of speed reductions than that resulting in the mechanism shown in Fig. 1. Fig. 8 is a side elevation view from the side at which the drive-shaft is located. Fig. 9 is a view similar to Fig. 7, showing the pinions and idlers in elevation.

The mechanism is inclosed within a suitable case which, in practice, contains lubricant in which the gear mechanism operates and this case is preferably built up of sections or units which make it possibe to add reducing mechanism as may be desired until the desired ratio of reduction is attained. By thus organizing the case, additional gear-trains may be added and supported by adding sections of the case and the necessary intermediate supports thereto, and it is unnecessary to provide a separate case for each different speed-reducing mechanism of more or less units or an organization of mechanisms constituted of fewer or greater elements to attain different reductions is facilitated. The case comprises a hollow body formed of annular sections 10, 10$^a$ and 10$^b$, a removable side 11 at one end and a removable side 12 at the other end of the body. Between the annular body sections, supporting frames 32 and 32$^a$ are disposed, and bolts 13 extending through the sides, the body-sections and said frames, secure all of said parts together to form an inclosing case for the gear-mechanism. A drive-shaft 15 is journaled in a suitable bearing 16 in the case-side 11 and a packing-box 17 is provided at the end of the bearing to retain the lubricant in the case. It will be understood that shaft 15 may be driven from any suitable source of power at a high speed, and will communicate power by means of intermediate reducing gear-mechanism to a driven shaft 18 which is journaled in caseside 12. Shaft 15 and the driven shaft 18 are co-axially disposed or alined and extend outwardly from the sides of the case respectively, so that the former may be connected to a suitable source of power, such as an electric motor, and the shaft 18 will serve to drive the mechanism to be driven at a reduced speed. Shaft 18 is journaled in a suitable bearing 19 in the case side 12 and a packing-box 20 retains lubricant in the case.

A pinion 21 is formed on the inner end of the drive shaft 15 and adjacent to the inner side of the case-side 11. This pinion meshes with a series of idlers 22 each of which is suitably journaled on a stud 23 which is secured in the case by a nut 24. Each stud is provided with a shoulder 25 facing the inner face of the side 11 and a head 26 at its inner end, so that the pinion mounted thereon will be free to rotate. Idlers 22 communicate power from the pinion 21 to a wheel 27 having internal teeth 28 and which is concentrically mounted with respect to shafts 15 and 18. The pitch-diameter of this wheel is much greater than that of pinion 21, so that the speed of the wheel 27 will be correspondingly reduced. Gear-wheel 27 is keyed or secured to the hub of a pinion 28, so that movement will be communicated from said wheel to said pinion, the latter being much less in diameter to cause the gear driven thereby to be operated at a correspondingly less speed. Pinion 28 is provided with a bushing 29 and is journaled on a reduced portion 30 of the driven shaft 18. The inner end of shaft 18 is further reduced as at 31 and this reduced end is journaled in drive-shaft 15 so that the driven shaft will be supported and kept in accurate alinement with the driven shaft by being supported in the drive shaft adjacent to the journal 16 for the latter.

An intermediate support 32 is secured in the case, to provide an inner support or bearing for the driven shaft 18, the latter being journaled in a bushing 33 secured in said support. Resultantly, the driven shaft and the gears mounted in said frame and meshing with gears on said shaft, will be accurately kept in operative relation and be supported in the case. The supporting frame 32 is provided with openings 32$^b$ which permit the oil in the case to pass from one side of the case to the other.

Pinion 28 meshes with a series of gears 34 each of which is keyed to a shaft 35, which is journaled in a bearing 36 in supporting-frame 32 and extends through said frame and at its opposite end shaft 35 is formed with a pinion 37. All of these pinions 37 engage a wheel 38 having an internal series of teeth 39. To provide additional shaft at one end and the inward stresses at the opposite end, each gear wheel 34 is provided with an annular rib or flange 40 which fits in a corresponding groove 41 in the support 32. This flange traveling in the groove in support 32, relieves the shaft 35 of stresses which are likely to cause it to wear away the bearing 36, and provides a construction in which a narrow support or bearing suffices for the pinion shaft 35.

Pinions 37 are smaller than gear wheels 34 and resultantly, the speed of pinions 37 with respect to pinion 28 will be reduced. Pinions 37 mesh with internally disposed teeth 53$^a$ of a wheel 53 which has a hub 54 through which the driven shaft 18 extends and said hub is journaled in an intermediate supporting-frame 32$^a$. Wheel 53 is disposed at one side of supporting-frame 32$^a$ and a pinion 55 is formed on the hub of said wheel at the other side of said frame. Pinion 55 is smaller than the pitch-diameter of the gear wheel 53 and revolves at a lower speed than pinions 37 and shafts 35 to cause further reduction of the speed of shaft 18 with respect to drive-shaft 15. A series of idler pinions 56 are journaled on studs 57 formed on, and projecting laterally from supporting frame 32$^a$, each being held on one of said studs by a disk 57$^a$ and screw 58. The outer portions of idler pinions 56 mesh with internally disposed teeth 39 of a wheel 38 which is secured on the driven shaft 18 by a key 42.

The side 12 of the case is provided with a screw-threaded opening, which is closed by a plug 50 to permit lubricant to be introduced into the gear-case, so that the entire mechanism will run in the lubricant. Side 11 of the case is also provided with an opening 51 which is closed by a plug 52 to permit the lubricant to be drained from the case when desired.

In operation, shaft 15 will be driven at high speed, usually from an electric motor. Pinion 21 will be driven by said shaft and will rotate idlers 22 which will impart rotation in the opposite direction to the gear-wheel 27 at a reduced speed, corresponding to the ratio between pinion 21 and said gear-wheel 27, and the latter will correspondingly rotate pinion 28 to drive gears 34 and shafts 35 whereon they are mounted and to which they are secured. The relative speed of shafts 35 and pinion 28 will be reduced correspondingly to the ratio of pinion 28 and the gears 34 thus resulting in further reduction of speed. Pinions 37 on shafts 35 will drive gear-wheel 53 and pinion 55 at a lower speed, and said pinion will, through idlers 56, drive gear-wheel 38 at a correspondingly lower speed. Gear-wheel 38 will drive driven shaft 18. Resultantly, the improved speed reducing mechanism, as described and illustrated in Figs. 1 to 7, involves four reductions of speed, i. e., first, between pinion 21 and gear wheel 27; second, the reduction resulting from the ratio between pinion 28 and gear-wheels 34; third, the reduction resulting from the ration between pinions 37 and gear wheel 53, and fourth that resulting from the ratio between pinion 55 and gear-wheel 38.

An advantage of the improved construction is that by replacing pinion 28 and gear-wheels 34 with gears of different ratios, the reduction may be varied. Thus for example; if the reduction effected by the mechanism shown is 120 to 1, and pinion 28 is disconnected from gear wheel 27 and gear wheels 34 are disconnected from their shaft 35 and gears 28 and 34 of the same diameter are substituted, the ratio of speed between the driven shaft 18 and the drive shaft 15 will be one to sixty. Therefore, the invention provides a speed reducing gear which permits the ratio of reduction to be conveniently varied or adapted for different reductions. By removing the case side 11 from the body 10 of the case and withdrawing shaft 15 and idlers 22 which are journaled on studs 23 from the case, the gear-wheel 27, pinion 28 and gear-wheels 34 will be readily accessible to permit the substitution of gear wheel necessary to effect change in the ratio of reduction in this manner.

An important feature of the invention consists in providing an intermediate or central support in the case and disposing the speed-reducing gears at both sides thereof and in utilizing this support for keeping one or more of the shafts in correct alinement with respect to the other coöperating parts. In the embodiment of the invention shown, the driven shaft is journaled in the intermediate support, so that its inner end will be truly positioned and held against driving stresses and the intermediae supports serve also to carry the intermediate shafts 35 in correct relation with respect to the driven shaft, so that the pinions 37 and gear 38 will be supported in true driving relation and remain unaffected by the driving stresses. Also by mounting the idler gear 22 on bearings supported by the case and mounting the gear wheel 27 and pinion 28 on the shaft 18 adjacent the intermediate support or bearing for the latter shaft, and supporting the shafts 35 in the intermediate support, the correct relative position of the gear train between pinion 21 and shafts 35 will always be maintained.

Another feature of the invention consists in providing a construction which is constituted of units or elements capable of being built up into a structure for effecting greater or less reductions in speed between the drive-shaft and the driven shaft. By forming the case with one or more removable body-sections and an intermediate support, the improved mechanism is adapted for variation to effect a greater or less number of reductions than that exemplified in Figs. 1 to 6 of the drawings. Manifestly, by adding supports 32ª, gear-wheels 53 with pinions 55 and the body section, the case may be expanded to contain and support the additional gears necessary to attain even greater reduction of speed. So also by removing gear 53, body section 10ª, intermediate support 32ª, idlers 56 and gear-wheel 38 and substituting for the latter a wheel which is adapted to mesh with pinions 37, a mechanism which involves one less reduction may be provided. Such a construction is illustrated in Figs. 7 and 9 of the drawings, in which a gear-wheel 38ª keyed to the driven shaft meshes with pinions 37, body-sections 10ª, supporting-frame 32ª and the gears and pinions mounted therein having been removed and body-section 10ᵇ, case-side 12 having been brought into position to form together with the remaining parts of the case, a complete inclosing case for the gear-mechanism thus organized. Manifestly, therefore, by the expansion or contraction of the case and variation of the gear-mechanism, by the addition or removal of its units, different reductions of speed between the drive-shaft and the driven shaft may be effected. If desired, an inwardly disposed hub 54ª may be formed on gear-wheel 53 and an idler 45 (Figs. 1 and 5) journaled on said hub to mesh with all of the pinions 37 and a like gear-wheel 45ª may be journaled on gear-wheel 38ª (Fig. 7) to mesh with all of the pinions 37.

The invention is not to be understood as restricted to the details illustrated and described, since these may be modified within the scope of the appended claims without departing from the spirit and scope of the invention.

Having thus described the invention what I claim as new and desire to secure by Letters Patent, is:

1. The combination of a non-rotatable case having fixed sides, a drive shaft, and a driven shaft journaled in the fixed sides of the case respectively, a pinion in the case and on the drive shaft, studs carried by one side of the case and sustained against bodily movement thereby, idlers on said studs respectively; an internally toothed rotatable gear meshing with said idlers, and gearing between said internally toothed gear and the driven-shaft.

2. The combination of a non-rotatable case having fixed sides, a drive shaft and a driven shaft journaled in the fixed sides of the case respectively, and co-axial with each other, a pinion in the case and on the drive shaft, studs fixed on one side of the case and secured against bodily movement thereby, idlers on said studs respectively, an internally toothed rotatable gear meshing with said idlers, and gearing between said internally toothed gear and driven shaft.

3. The combination of a non-rotatable case having fixed sides, a drive-shaft mounted in one side of the case, a driven shaft mounted in the other side of the case, an intermediate fixed support, and gear-mechanism for driving the driven shaft at a different relative speed with respect to the drive shaft comprising gears at each side of said support, and shafts journaled in and extending through said support and to each end of which one of said gears is secured, said case being formed of sections to permit removal of the gears at one side of the support and the substitution of other gears therefor.

4. The combination of a non-rotatable case having fixed sides, a drive-shaft mounted in one side of the case, a driven shaft co-axially mounted with respect to the drive shaft in the other side of the case, an intermediate fixed support separably secured in the case and gear-mechanism for driving the driven shaft at a different relative speed with respect to the drive shaft comprising gears at each side of said support, and shafts extending through said support and to each end of which one of said gears is secured.

5. The combination of a non-rotatable case, a drive-shaft mounted in one side of the case, a driven shaft mounted in the other side of the case, an intermediate fixed support in which one of said shafts is journaled, a pinion on the drive-shaft, studs secured to the case, idler-gears on said studs and meshing with said pinion and gear-mechanism between said idlers and the driven shaft, comprising an internally toothed gear engaging said idlers, said gear and idlers being disposed at one side of said support, said gear-mechanism comprising also gears at the other side of said support operated by said internally toothed gear.

6. The combination of a non-rotatable case, a drive-shaft mounted in one side of the case, a driven shaft mounted in the other side of the case, an intermediate fixed support in which one of said shafts is journaled, a pinion on the drive-shaft, studs secured to the case, idlers on said studs and meshing with said pinions, and gear-mechanism between said idlers and the driven shaft comprising an internally toothed gear engaging said idlers, said gear and idlers being disposed at one side of said support, said gear-mechanism comprising also gears at the other side of said support operated by said internally toothed gear, said internally toothed gear being mounted to revolve around one of said shafts.

7. The combination of a non-rotatable case, a drive shaft journaled in one side of the case, a driven shaft journaled in the other side of the case, an intermediate fixed support in which one of said shafts is journaled, a pinion on the drive-shaft, studs secured to the case, idlers on said studs and meshing with said pinion, and gear-mechanism between said idlers and the driven shaft comprising an internally toothed gear engaging said idlers, said gear and idlers being disposed at one side of said support, said gear mechanism comprising also gears at the other side of said support operated by said internally toothed gear, said internally toothed gear being mounted to revolve around the driven shaft and having a hub through which the driven shaft extends.

8. The combination of a non-rotatable case, a drive-shaft, a pinion on said shaft, idler gears sustained by fixed journals, a revoluble internally toothed gear meshing with said idlers, a pinion rotating with said internally toothed gear, a driven shaft, an internally toothed revoluble gear secured to the driven shaft, and gearing between the pinion on the first mentioned toothed gear and the gear on the driven shaft comprising a plurality of pinions engaging the internally toothed wheel on the driven shaft.

9. The combination of a non-rotatable case, a drive-shaft, a pinion on said shaft, idler gears sustained by fixed journals, a revoluble internally toothed gear meshing with said idlers, a pinion rotating with said internally toothed gear, a driven shaft, an internally toothed revoluble gear secured to the driven shaft, and gearing between the pinion on the first mentioned internally toothed gear and the gear on the driven shaft, comprising a plurality of pinions meshing with the internally toothed gear on the driven shaft and pinions rotating with said latter pinions and meshing with the pinion on the first mentioned internally toothed gear, and a fixed support between the internally toothed gears by which said intermediate gears are sustained.

10. The combination of a non-rotatable case, a drive-shaft, a driven shaft, a pinion on the drive-shaft, idlers journaled on the case and engaging said pinion, an internally toothed gear meshing with said idlers, a pinion on said gear, an internally toothed gear wheel secured to the driven shaft and gearing between said latter internally toothed gear on the pinion and the internally toothed gear engaging said idlers and an intermediate fixed support provided with bearings for said gearing, the latter comprising idlers carried by said bearings.

11. The combination of a case, a drive-shaft journaled in one side of the case, a driven shaft journaled in the other side of the case concentrically with said driven shaft, a pinion on the drive shaft, idlers journaled on the case and engaging said pinion, an internally toothed gear meshing with said idlers, a pinion on said gear, gear-wheels engaging said pinion, shafts to which said latter gear wheels are secured, fixed bearings for said shafts, pinions on said shafts respectively and an internally toothed gear secured to the driven shaft and engaging the latter pinions.

12. The combination of a case, a drive-shaft, a pinion on said shaft, idlers meshing with said pinion and mounted on fixed journals, an internally toothed gear meshing with said idlers, a pinion secured to revolve with said gear, gear-wheels meshing with the latter pinion, shafts on which the latter gear wheels are respectively fixed, bearings for said latter shafts, pinions on said latter shafts respectively, an internally toothed gear wheel meshing with said latter pinions and a driven shaft to which the latter internally toothed wheel is operatively connected, the pinions on the first internally toothed gear wheel and the gear wheels meshing with said pinion being removable, so that the ratio of reduction may be varied by the substitution of different sized pinion and gears.

13. The combination of a case, a drive-shaft journaled in the case, a driven shaft journaled in the case, a pinion on the drive-shaft, an intermediate fixed support between the sides of the case and gear-mechanism for driving the driven shaft from said pinion comprising gears sustained by said intermediate support, the support and gear wheels being provided with an interfitting flanges and grooves.

14. The combination of a case, a drive-shaft journaled in the case, a driven shaft journaled in the case, a pinion on the drive-shaft, an intermediate fixed support between the sides of the case and gear-mechanism for driving the driven shaft from said pinion comprising shafts mounted in said intermediate support and gear wheels at the opposite ends of said shafts respectively, said support and some of the pinions having interfitting parts.

15. The combination of a stationary case, a drive-shaft mounted in one side of the case, a driven shaft mounted in the other side of the case, a pinion secured to the drive-shaft, gearing between said pinion and the driven shaft, and an intermediate support for some of the gearing, removably secured in the case, said gearing comprising elements carried by said support, said case being built up of sections, whereby the ratio of the driven shaft with respect to the drive-shaft may be changed by the addition or removal of some of the elements of said gearing and the addition or removal of one of said supports.

16. The combination of a stationary case, a drive-shaft mounted in one side of the case, a driven shaft mounted in the other side of the case, a pinion on the drive shaft, an internally toothed gear wheel having a pinion secured thereto, gearing between said gear-wheel and the pinion on the drive shaft, an intermediate fixed support by which said gear wheel and the latter pinion are revolubly sustained, idlers carried by said intermediate fixed support and an internally toothed gear wheel engaging said idlers and operatively connected to the driven shaft.

17. The combination of a stationary case, a drive-shaft mounted in one side of the case, a driven shaft mounted in the other side of the case, a pinion on the drive shaft, an internally toothed gear wheel having a pinion secured thereto, and connected to be driven by the pinion on the drive-shaft, an intermediate fixed removable support by which said gear wheel and the latter pinion are revolubly sustained, idlers carried by said intermediate fixed support and an internally toothed gear wheel engaging said idlers and operatively connected to the driven shaft.

18. The combination of a stationary case, a drive-shaft mounted in one side of the case, a driven shaft mounted in the other side of the case, said shafts being co-axial, a pinion on the drive-shaft, gear-mechanism between said pinion and the driven shaft, comprising a plurality of internally toothed gear wheels co-axial with the said shafts, a pinion on one of said internally toothed gear wheels, comprising plural series of idlers, one series engaging the pinion on the internally toothed gear and another engaging another of the internally toothed gears.

19. The combination of a stationary case, a drive-shaft mounted in one side of the case, a driven shaft mounted in the other side of the case, said shafts being co-axial, a pinion on the drive-shaft, gear-mechanism between said pinion and the driven shaft, comprising a plurality of internally toothed gear wheels co-axial with the said shafts, a pinion on one of said internally toothed gear wheels, comprising plural series of idlers, one series engaging the pinion on the internally toothed gear and another engaging another of the internally toothed gears and an intermediate support in the case for the idlers.

20. The combination of a stationary case built up of a plurality of longitudinal sections, a drive-shaft and a driven shaft mounted in the sides of the case, gearing in the case between said shafts comprising plural series of idlers having fixed bearings and internally toothed gears, and a removable fixed support in the case and carrying a series of said idlers and one of the internally toothed gears.

21. The combination of a stationary case, a drive-shaft mounted in one side of the case, a driven shaft mounted in the other side of the case, a pinion on the drive-shaft, gear mechanism between said pinion and the driven shaft comprising idlers having fixed bearings, an internally toothed gear-wheel driven by said idlers, an intermediate support by which the idlers are carried, said support, the idlers carried thereby and the gear wheel being removable, said case being formed of sections, so that the case may be built up or reduced.

JOHN B. FOOTE.

Witnesses:
 FRED GERLACH,
 HILDUR C. PETERSEN.

Copies of this patent may be obtained for five cents each, by addressing the "Commissioner of Patents, Washington, D. C."